United States Patent
Erbey et al.

(10) Patent No.: US 8,275,701 B2
(45) Date of Patent: Sep. 25, 2012

(54) METHOD AND SYSTEM FOR MORTGAGE EXCHANGE

(75) Inventors: William C. Erbey, Luxembourg (LU); Christopher Kennedy, Luxembourg (LU); Bryan Hurley, Lake Worth, FL (US); Andrew Combs, Apollo Beach, FL (US)

(73) Assignee: Altisource Solutions S.à r.l., Luxembourg (LU)

( * ) Notice: Subject to any disclaimer, the term of this patent is extended or adjusted under 35 U.S.C. 154(b) by 0 days.

(21) Appl. No.: 13/076,044

(22) Filed: Mar. 30, 2011
(Under 37 CFR 1.47)

(65) Prior Publication Data
US 2011/0178921 A1    Jul. 21, 2011

Related U.S. Application Data

(63) Continuation of application No. 11/802,308, filed on May 22, 2007, now abandoned, which is a continuation-in-part of application No. 10/937,879, filed on Sep. 10, 2004, now Pat. No. 7,707,055.

(60) Provisional application No. 60/802,110, filed on May 22, 2006, provisional application No. 60/502,273, filed on Sep. 12, 2003.

(51) Int. Cl.
*G06Q 40/00* (2006.01)
(52) U.S. Cl. ............................ 705/38; 705/35
(58) Field of Classification Search .................... 705/38, 705/35
See application file for complete search history.

(56) References Cited

U.S. PATENT DOCUMENTS

| | | | |
|---|---|---|---|
| 4,799,156 | A | 1/1989 | Shavit et al. |
| 5,592,375 | A | 1/1997 | Salmon et al. |
| 5,758,328 | A | 5/1998 | Giovannoli |
| 5,799,289 | A | 8/1998 | Fukushima et al. |
| 5,940,812 | A | 8/1999 | Tengel et al. |
| 5,995,947 | A | 11/1999 | Fraser et al. |
| 6,513,019 | B2 | 1/2003 | Lewis |
| 6,594,633 | B1 | 7/2003 | Broerman |
| 6,606,606 | B2 | 8/2003 | Starr |
| 6,711,554 | B1 | 3/2004 | Salzmann et al. |
| 6,985,886 | B1 | 1/2006 | Broadbent et al. |
| 7,072,857 | B1 | 7/2006 | Calonge |
| 7,089,503 | B1 | 8/2006 | Bloomquist et al. |
| 7,107,241 | B1 * | 9/2006 | Pinto .............................. 705/38 |

(Continued)

FOREIGN PATENT DOCUMENTS
WO    0115047 A1    3/2001

OTHER PUBLICATIONS

Office Action, dated Jan. 25, 2012, from corresponding Application U.S. Appl. No. 12/335,196.

(Continued)

*Primary Examiner* — Jagdish Patel

(57) ABSTRACT

A method and system for electronically facilitating real estate transactions by providing accurate representations of the loans a borrower is qualified to receive, which are based on actual data, rather than estimates. All actions required for completing the real estate transaction, from entry of the borrower information to the closing and funding of the loan, are seamlessly integrated. An automated underwriting engine is provided for generating a decision matrix based on user input and/or existing data. An appropriate loan is selected based on the decision matrix, and is communicated to a potential borrower. After a loan is selected, fulfillment processing is performed, and the loan is funded and closed.

20 Claims, 7 Drawing Sheets

U.S. PATENT DOCUMENTS

| | | | |
|---|---|---|---|
| 7,349,868 B2 | 3/2008 | Tenorio |
| 7,389,242 B2 | 6/2008 | Frost |
| 7,392,216 B1 | 6/2008 | Palmgren et al. |
| 7,444,302 B2 | 10/2008 | Hu et al. |
| 7,451,106 B1 | 11/2008 | Gindlesperger |
| 7,555,459 B2 | 6/2009 | Dhar et al. |
| 7,707,055 B2 | 4/2010 | Behmoiras et al. |
| 7,707,071 B2 | 4/2010 | Rigole |
| 7,707,153 B1 | 4/2010 | Petito et al. |
| 8,024,261 B2 | 9/2011 | Erbey et al. |
| 2002/0023046 A1 | 2/2002 | Callahan et al. |
| 2002/0040339 A1 | 4/2002 | Dhar et al. |
| 2002/0052835 A1 | 5/2002 | Toscano |
| 2002/0138413 A1 | 9/2002 | Creamer et al. |
| 2002/0188483 A1 | 12/2002 | Fisher |
| 2003/0004854 A1 | 1/2003 | Greene et al. |
| 2003/0018558 A1 | 1/2003 | Heffner et al. |
| 2003/0018575 A1 | 1/2003 | Beggins et al. |
| 2003/0033587 A1 | 2/2003 | Ferguson et al. |
| 2003/0101085 A1 | 5/2003 | Butler et al. |
| 2003/0233316 A1 | 12/2003 | Hu et al. |
| 2004/0019528 A1 | 1/2004 | Broussard et al. |
| 2004/0083119 A1 | 4/2004 | Schunder et al. |
| 2004/0083148 A1 | 4/2004 | Chadrow |
| 2004/0088411 A1 | 5/2004 | Jakubowski et al. |
| 2004/0111346 A1 | 6/2004 | Macbeath et al. |
| 2004/0249705 A1 | 12/2004 | Spencer et al. |
| 2004/0249914 A1 | 12/2004 | Flocken et al. |
| 2005/0010423 A1 | 1/2005 | Bagbey et al. |
| 2006/0155640 A1 | 7/2006 | Kennedy et al. |
| 2006/0190394 A1 | 8/2006 | Fraser et al. |
| 2009/0240596 A1 | 9/2009 | Kennedy et al. |
| 2010/0268558 A1 | 10/2010 | Behmoiras et al. |

OTHER PUBLICATIONS

"MindBox", ARTEnterprise, 2005, 8 pages.
"Ocwen Unveils Enhanced Vendor Management Tool for Mortgage," www.press.arrivenet.com, Mar. 24, 2005, pp. 1-2.
"The Growth of Internalized Vendor Management Subsidiaries," www.atmprof.com, Mar. 31, 2005, pp. 1-2.
"Vendor Management Subsidiary Strategic Benefits," www.atmprof.com, Mar. 31, 2005, pp. 1-2.
American Land Title Association, "ALTA Technology New", pp. 2, Jul. 10, 2007, http://www.alta.org/technology/news.cfm?newsID=5187.
Dorado White Paper, "The Dorado Advantage-Networked Origination for the Agile Enterprise", 12 pages, 2006.
Metavante Lending Solutions, "Loan Origination Studio: Metavante Lending Solutions", 2007, 10 pages, http://www.ghrsystems.com/ProductsServices/mortgage.sub.—solutions/ghr.s- ub.--los.html.
Mortgage Cadence Enterprise Lending Solutions, "Mortgage Cadence Orchestrator (Business Components)", 2007, 4 pages, http://www.mortgagecadence.com/productsOrchestrator.asp.
Scott Kersnar, "Putting All The Pieces Together", SourceMedia Inc. and Mortgage Technology, vol. 13, No. 6, Jul. 2006.
Final Office Action, dated Jan. 8, 2010, from corresponding U.S. Appl. No. 11/802,306.
Final Office Action, dated Oct. 21, 2010, from corresponding U.S. Appl. No. 11/301,247.
Final Office Action, dated Oct. 28, 2009, from corresponding U.S. Appl. No. 11/301,247.
Final Office Action, dated Sep. 16, 2008, from corresponding U.S. Appl. No. 11/301,247.
Notice of Allowance, dated Oct. 21, 2011, from corresponding U.S. Appl. No. 12/335,196.
Notice of Allowance, dated May 16, 2011, from corresponding U.S. Appl. No. 11/802,306.
Office Action, dated Apr. 21, 2011, from corresponding U.S. Appl. No. 12/335,196.
Office Action, dated Aug. 24, 2010, from corresponding U.S. Appl. No. 11/802,306.
Office Action, dated Dec. 1, 2011, from corresponding U.S. Appl. No. 13/232,010.
Office Action, dated Jun. 16, 2009, from corresponding U.S. Appl. No. 11/802,306.
Office Action, dated Mar. 24, 2008, from corresponding U.S. Appl. No. 11/301,247.
Office Action, dated Mar. 24, 2009, from corresponding U.S. Appl. No. 11/301,247.
Office Action, dated Mar. 3, 2010, from corresponding U.S. Appl. No. 11/301,247.
Related case—U.S. Appl. No. 13/232,010, filed Sep. 14, 2011, entitled "Method and System for Loan Closing."
Office Action, dated Apr. 27, 2012, from corresponding U.S. Appl. No. 12/723,358.

* cited by examiner

METHOD AND SYSTEM FOR MORTGAGE EXCHANGE

CROSS-REFERENCE TO RELATED APPLICATIONS

This application is a Continuation of U.S. application Ser. No. 11/802,308 filed on May 22, 2007, which claims the benefit of Provisional Application Ser. No. 60/802,110 filed May 22, 2006. Further, this application is a continuation-in-part application of Applicants' U.S. Non-Provisional Application Ser. No. 10/937,879, now U.S. Pat. No. 7,707,055, titled "METHOD AND SYSTEM FOR VENDOR MANAGEMENT" filed Sep. 10, 2004, which claims the benefits of Provisional Application Ser. No. 60/502,273 filed Sep. 12, 2003. Each of the above-mentioned patent applications are incorporated in its entirety by reference herein.

BACKGROUND OF THE INVENTION

1. Field of the Invention

The present invention relates to methods and systems for facilitating real estate transactions by providing accurate representations of the loans a borrower is qualified to receive, which are based on actual data, rather than estimates. Specifically, the present invention relates to methods and systems for facilitating real estate transactions that provide seamless integration of actions required for completing the real estate transaction, from entry of the borrower information, to the closing and funding of the loan.

2. Background of the Technology

There exist in the art paper-based methods and systems for completing financial transactions, such as mortgages, but typically these systems are inefficient, costly, and add significant overhead to the transaction. Currently, the parties to a transaction inefficiently transfer the necessary documents to complete the mortgage transaction. Usually, all involved parties receive a new set of documents each time the transaction is altered. Most transactions are currently completed by transferring new sets of documents by hand. The systems that execute document transfers electronically typically do not integrate sub-transactions required for the completion of the transaction, but instead require either a separate process to convert electronic data between forms, or hand transcription of data from one form to another. Since a mortgage transaction generally involves multiple parties, the resources needed to complete the transaction quickly accumulate.

For the purposes of this application, "financial institutions" include banks, investment companies, real estate lenders, investment and holding companies, and any commercial entity engaged in the business of financing loans or mortgages. "Brokers" include brokerages, real estate agents, corporate land purchasers, and any commercial entity, individual or otherwise, engaged in the business of buying and/or selling real estate. "Potential borrower" or "borrower," and "potential customer" or "customer," are used interchangeably herein to describe any person, including agents of the person, seeking to acquire a mortgage or loan, e.g., by employing the services of a broker or financial institution.

A sub-transaction, also interchangeably referred to herein as an order or product, relates to goods or services being provided during the life of the underlying mortgage transaction. Sub-transactions define the parameters of the transaction or otherwise bring the underlying transaction to completion. Sub-transactions include transactions between the end users of the system (e.g., brokers, financial institutions and potential borrowers) and vendors, such as inspection companies or closing companies that have service agreements with end users or other involved parties.

The complicated nature of a mortgage or loan transaction, coupled with the large number of parties that must approve each stage of the transaction, creates difficulty in keeping all parties properly updated. Presently, involved parties receive updated paper copies of the transaction every time a component of the transaction is altered, or the status of a sub-transaction is changed. Additionally, it is difficult for the parties to check the status of a transaction component until they receive actual notification that it has been changed. This lag time in notification may lead to a party entering a sub-transaction based on dated information.

Computer-implemented systems to manage financial transactions are known, but these systems typically do not manage most of or the entire lifespan of a mortgage transaction. As a result, the integration of various actions and sub-transactions of a mortgage transaction must either be done by hand, or through the use of systems that are either completely incompatible, or, require the input of incompatible data. The problem is further compounded because, as a mortgage transaction usually requires the completion of one or more sub-transactions, each of which may be managed by incompatible or inefficiently communicating systems.

Another problem with completing financial transactions in the prior art is that existing methods and systems for assisting a broker in loan selection lack the capability of providing brokers with accurate representations of the loans for which a potential borrower qualifies. These systems typically only provide an estimation of the types of loans available to a potential borrower, based on hypothetical conditions and/or incomplete or inaccurate data. Brokers often make loan/mortgage decisions without the benefit of all available information. As a result, the broker may fail to obtain the most advantageous loan for the potential borrower, or the broker may fail to obtain a loan for a qualified borrower, costing the broker time, unrealized commission fees, and possibly loss of business. This creates problems not only for potential borrowers, who may receive less favorable terms on their mortgages, but also for brokers, who cannot secure the best loans for their clients. Another result of this problem is that financial institutions may experience more defaulted loans and fail to take full advantage of opportunities to purchase favorable loans.

Yet another problem with financial transactions of the prior art is that financial institutions typically do not purchase loans directly from brokers, because systems that allow direct cost-effective purchasing of loans are not currently available. Attempts by financial institutions to purchase loans from brokers have been largely unsuccessful. There exist in the art methods and systems for third parties to purchase loans from brokers, to package the loans together, and to sell the packages to financial institutions. These third parties, also known as congregators, purchase individual loans from brokers, then combine the individual loans into packages for sale to financial institutions. This process increases the loan processing costs due to congregators' fees.

There is an unmet need in the art, therefore, for methods and systems that provide brokers with an accurate representation of the set of loans for which a potential borrower qualifies. There is a further unmet need in the art for methods and systems that allow seamless completion of various sub-transactions related to a mortgage transaction.

There is a further unmet need in the art for methods and systems that manage mortgage transactions by integrating all or most related sub-transactions, so that one central system contains all existing information about the status of the associated sub-transactions. Additionally, there is an unmet need in the art for methods and systems that have the capability of identifying the order in which related sub-transactions must be completed for the primary loan transaction, and for automatically completing the sub-transactions.

There is a further unmet need in the art for automated loan purchasing functionality that enables financial institutions to purchase, or facilitate such institutions' purchase of, loans directly from brokers, and brokers to solicit loans directly from financial institutions.

There is a further unmet need for a system that is tailored to the needs of individual brokers, allowing design flexibility and customized design based on the specifications of individual brokers.

SUMMARY OF THE INVENTION

The present invention meets the above needs, and others, by providing a platform that embodies effective methods and systems for facilitating real estate transactions by providing accurate representations of the loans a borrower is qualified to receive, which are based on actual data, rather than estimates.

The present invention provides a method and system for electronically facilitating the completion of a mortgage loan using an automated underwriting engine, generating a decision matrix based on user input and/or existing data, and selecting and communicating an appropriate loan to a potential buyer. Subsequent to the selection of a favorable loan, the method and system of the present invention perform fulfillment processing. Upon completion of the fulfillment processing, an approval letter is generated. The method and system of the present invention may be interfaced with any number of systems and subsystems to prepare the loan for closing and funding.

When end users begin the process of applying for a mortgage, a number of sub-transactions must be performed in conjunction with the underlying transaction, including, for example, property appraisal, credit history evaluation of the potential borrower, selection of the proper loan by an underwriting process or engine, and application of the loan to the customer.

In one embodiment, the present invention compiles actual information obtained from potential borrowers, and uses the compiled information in making decisions on loan applications, rather than using estimates. The present invention is capable of generating generally precise or exact lists of loans, for which potential borrowers qualify. These lists may be used to assist brokers in making accurate and appropriate recommendations to potential borrowers. By using this system, brokers avoid loans that are based on estimates, which may expose all involved parties to potential unwanted risks and/or liability.

One embodiment of the present invention utilizes fully customizable modules, back-end processing and integration, and a common base platform for running the fully customizable modules. The present invention seamlessly integrates the various systems required to complete a mortgage or loan transaction and associated sub-transactions, for a wide range of actual implementations of these systems and sub-transactions.

In one embodiment, the present invention includes systems and methods for ordering the sub-transactions required to complete the primary transaction. The sub-transactions may be ordered by potential borrowers, brokers, or primary or secondary financial institutions. In one embodiment, the present invention includes systems and methods that allow sub-transaction vendor selection at the time of ordering the sub-transaction.

The present invention efficiently carries out sub-transactions by automating functions typically carried out manually. By automating these functions, the present invention eliminates transcription errors, reduces transaction costs, and reduces overall costs by requiring fewer employees to manage the sub-transactions. Additionally, the present invention provides all involved parties with access to real-time updates of the transaction status and of precise costs and status costs of the sub-transactions.

In one embodiment, the present invention allows financial institutions to view individual loan sale offers directly, without using a third party congregator. This allows financial institutions to reduce costs that would otherwise be paid to a third party congregator. The present invention also allows for more selectivity among financial institutions, since the financial institutions are able to purchase loans individually, rather than having to select packages presented by the congregators. The financial institutions, in turn, may pass the savings on to brokers, who receive more favorable terms for the loans the brokers offer for sale.

One embodiment of the present invention provides automated document types to help manage sub-transactions. These document types include lists of conditions that potential borrowers must meet before they are considered eligible for a specific mortgage. For example, a potential qualified borrower having a good credit rating and ample working capital has a completely different set of requirements for loan approval than a potential borrower with poor credit and/or no access to liquid capital. Thus, the two potential borrowers would have remarkably different document types. In one embodiment, the present invention determines the set of criteria to be examined for each potential borrower, creates the document type, and updates the document type when additional information is obtained. For information that may be retrieved through an electronically-managed sub-transaction, one embodiment of the present invention automatically requests the completion of the relevant sub-transaction. For information that must be retrieved by hand, the present invention provides prompts for the information that needs to be retrieved.

One embodiment of the invention includes an implementation of an auction platform. The auction platform allows accessing brokers and financial institutions to view the loans available for sale or purchase. The auction platform provides users with the ability to filter and sort the loans by various characteristics, such as stratification rate, loan type, and requested interest rate. The auction platform allows financial institutions to place bids for the purchase of loans, allows brokers to view bids placed on the loans that have been offered for sale, and allows for seamless completion of transactions between brokers and financial institutions.

In one embodiment, the data passes seamlessly between various sub-transactions of the mortgage transaction. Depending on the vendor's preferences and the nature of the sub-transaction, the system of the present invention may be configured so that vendors, brokers, and financial institutions have the ability to send and receive data seamlessly, without the need for back-end conversion.

In one embodiment of the invention, financial institutions and other users have the capability of customizing the system to meet specific user needs. The system is customizable (e.g., in accordance with the user's preferences and needs) with respect to carrying out transactions and sub-transactions.

In one embodiment of the current invention, the system creates a unique profile for each transaction type. For example, a profile may specify the relationship between a broker and a financial institution or the type of loan a given financial institution prefers to purchase. Upon initiating a transaction, the current invention checks whether any party to the transaction is associated with any unique profiles stored within the database. If profiles exist, the present invention retrieves the information and uses it in completing the transaction. For instance, using the example above, if the located profile specifies the type of loan a financial institution is interested in purchasing, the system provides the financial institution with existing loans of the preferred types.

The present invention works in conjunction with other tools to streamline the process of obtaining a mortgage. In one embodiment of the present invention, information gathered by the system is stored and made accessible to vendors, brokers, and financial institutions as necessary to complete a transaction. Thus, sub-transactions are seamlessly integrated into the primary mortgage transaction. Automated vendor distribution functionality provides requesting parties with the ability to automate the distribution of orders to select service providers, based upon various criteria, which can be saved into a profile. Additionally, service providers may be selected based upon such factors as geographic location, vendor capacity, and threshold limits.

Advantages of the present invention include, among others: 1) allowing brokers to communicate directly with financial institutions; 2) reducing costs by allowing portions of the mortgage transaction process to be processed electronically; 3) building a decision matrix showing the most appropriate loan for each potential borrower and broker; and 4) allowing brokers to access the particular loans for which a potential borrower qualifies for.

Additional advantages and novel features of the invention will be set forth in part in the description that follows, and in part will become more apparent to those skilled in the art upon examination of the following or upon learning by practice of the invention.

DETAILED DESCRIPTION

The present invention provides methods and systems for facilitating real estate transactions by providing accurate representations of the loans a borrower is qualified to receive, which are based on actual data, rather than estimates. The present invention also provides methods and systems for facilitating the completion of a mortgage transaction and completing related sub-transactions, such as obtaining credit reports, pre-approvals for loans, credit management for potential borrowers, sale of loans to financial institutions, generating document types for potential borrowers, building decision matrices for determining the most appropriate type of loan, and generating approval letters. In one embodiment of the present invention, any party to a transaction, including potential borrowers, brokers, financial institutions, and agents for the parties, may initiate a sub-transaction to further the completion of the primary mortgage transaction.

In one embodiment of the present invention, methods and systems for selecting the most appropriate vendor for each sub-transaction are implemented. In one embodiment, vendors may enter information into the system related to sub-transactions the vendors are capable of completing. For instance, a title searcher may offer to complete employment history checks for potential borrowers over 30 years of age for the price of $1,000.00. The present invention stores this information, and when a potential borrower is being qualified for a loan, the system presents the vendor information to the broker. If the broker selects the vendor, the information is transmitted to the vendor, who completes the employment history check and enters the relevant information into the system. The broker can then access the entered information.

One embodiment of the present invention provides methods and systems for managing sub-transactions. Management of the sub-transactions involves identifying a sub-transaction that needs to be ordered; ordering the sub-transaction; providing information required to complete the sub-transaction; and integrating the result of that sub-transaction into the main transaction. One embodiment of the invention provides methods and systems that allow outsourcing of sub-transactions that cannot be completed electronically.

As an example of this feature, when a transaction is entered into the system, the transaction profile associated with the transaction may be used to determine the sub-transactions that must be carried out to complete the transaction. The system may also provide the user with information regarding optional sub-transactions related to the transaction. In this manner, automatic ordering of sub-transactions that are specific to a given transaction can be accomplished efficiently.

Figure 1:
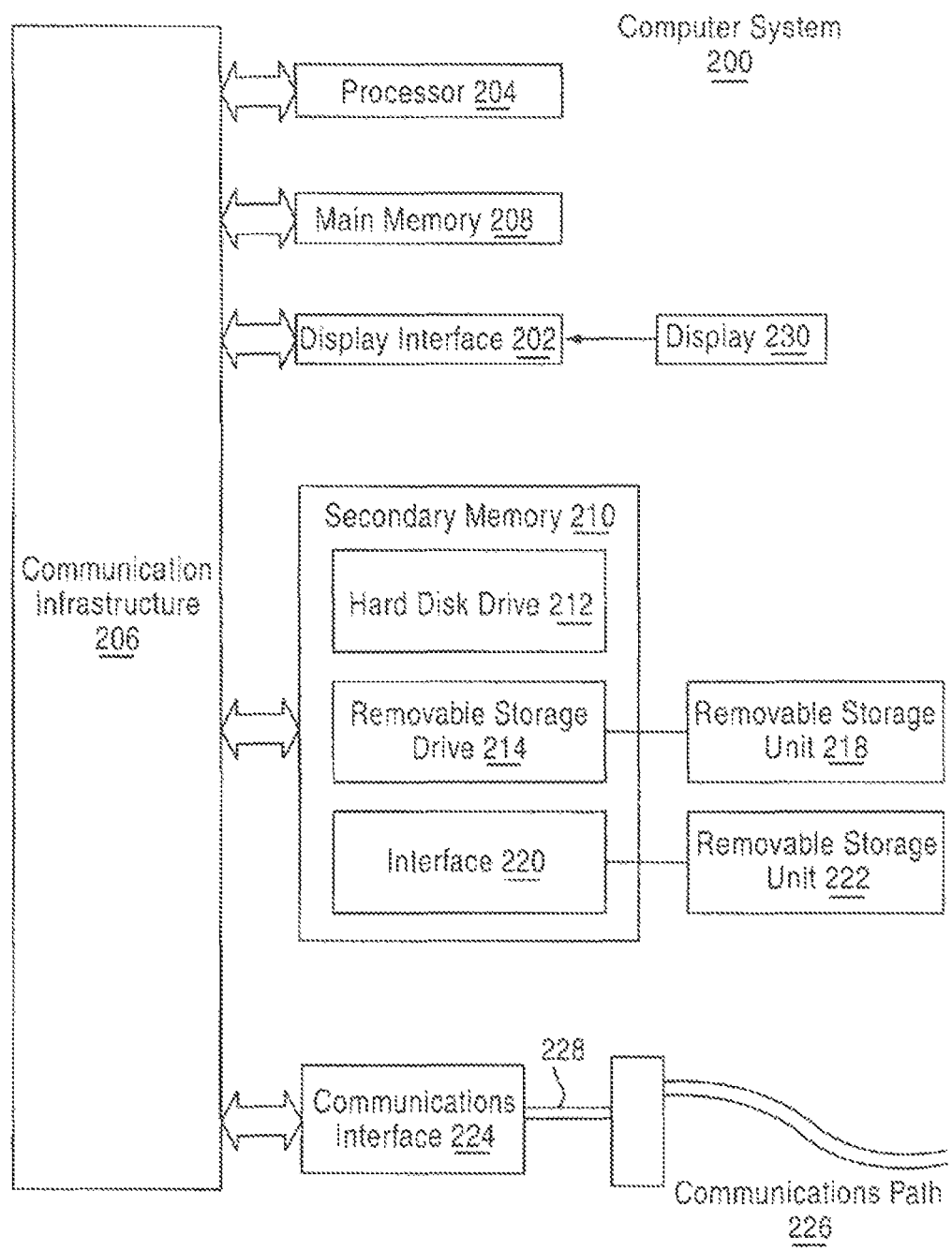
FIG. 1 presents a computer system implementation capable of carrying out the functionality of one embodiment of the current invention.

The present invention may be implemented using hardware, software or a combination thereof and may be implemented in one or more computer systems or other processing systems. In one embodiment, the invention is directed toward one or more computer systems capable of carrying out the functionality described herein. An example of such a computer system 200 is shown in FIG. 1.

Computer system 200 includes one or more processors, such as processor 204. The processor 204 is connected to a communication infrastructure 206 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

The computer system 200 includes a user interface 202 that forwards graphics, text, and other data from the communication infrastructure 206 (or from a frame buffer not shown) for display on a display unit 230. The computer system 200 also includes a main memory 208, preferably a random access memory (RAM), and may also include a secondary memory 210. The secondary memory 210 may include, for example, a hard disk drive 212 and/or a removable storage drive 214 such as a floppy disk drive, a magnetic tape drive, an optical disk drive, etc. The removable storage drive 214 reads from and/or writes to a removable storage unit 218, which may also be a floppy disk, magnetic tape, optical disk, etc., in a well known manner. As will be appreciated, the removable storage unit 218 includes a computer usable storage medium having stored therein computer software and/or data.

In alternative embodiments, secondary memory 210 may include other similar devices for allowing computer programs or other instructions to be loaded into computer system 200. Such devices may include, for example, a removable storage unit 222 and an interface 220. Examples of such devices may include a program cartridge and cartridge interface (such as that found in video game devices), a removable memory chip (such as an erasable programmable read only memory (EPROM), or programmable read only memory (PROM)) and associated socket, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228, which may be electronic, electromagnetic, optical or other signals capable of being received by communications interface 224. These signals 228 are provided to communications interface 224 via a communications path (e.g., channel) 226. This path 226 carries signals 228 and may be implemented using wire or cable, fiber optics, a telephone line, a cellular link, a radio frequency (RF) link and/or other communications channels. In this specification, the terms "computer program medium" and "computer usable medium" are used to refer generally to media such as a removable storage drive 214, a hard disk installed in hard disk drive 212, and signals 228. These computer program products provide software to the computer system 200. The invention is directed to such computer program products.

Computer programs (also referred to as computer control logic) are stored in main memory 208 and/or secondary memory 210. Computer programs may also be received via communications interface 224. Such computer programs, when executed, enable the computer system 200 to perform the features of the present invention, as discussed herein. In particular, the computer programs, when executed, enable the processor 204 to perform the features of the present invention. Accordingly, such computer programs represent controllers of the computer system 200.

In an embodiment where the invention is implemented using software, the software may be stored in a computer program product and loaded into computer system 200 using removable storage drive 214, hard drive 212, or communications interface 224. The control logic (software), when executed by the processor 204, causes the processor 204 to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Figure 2:
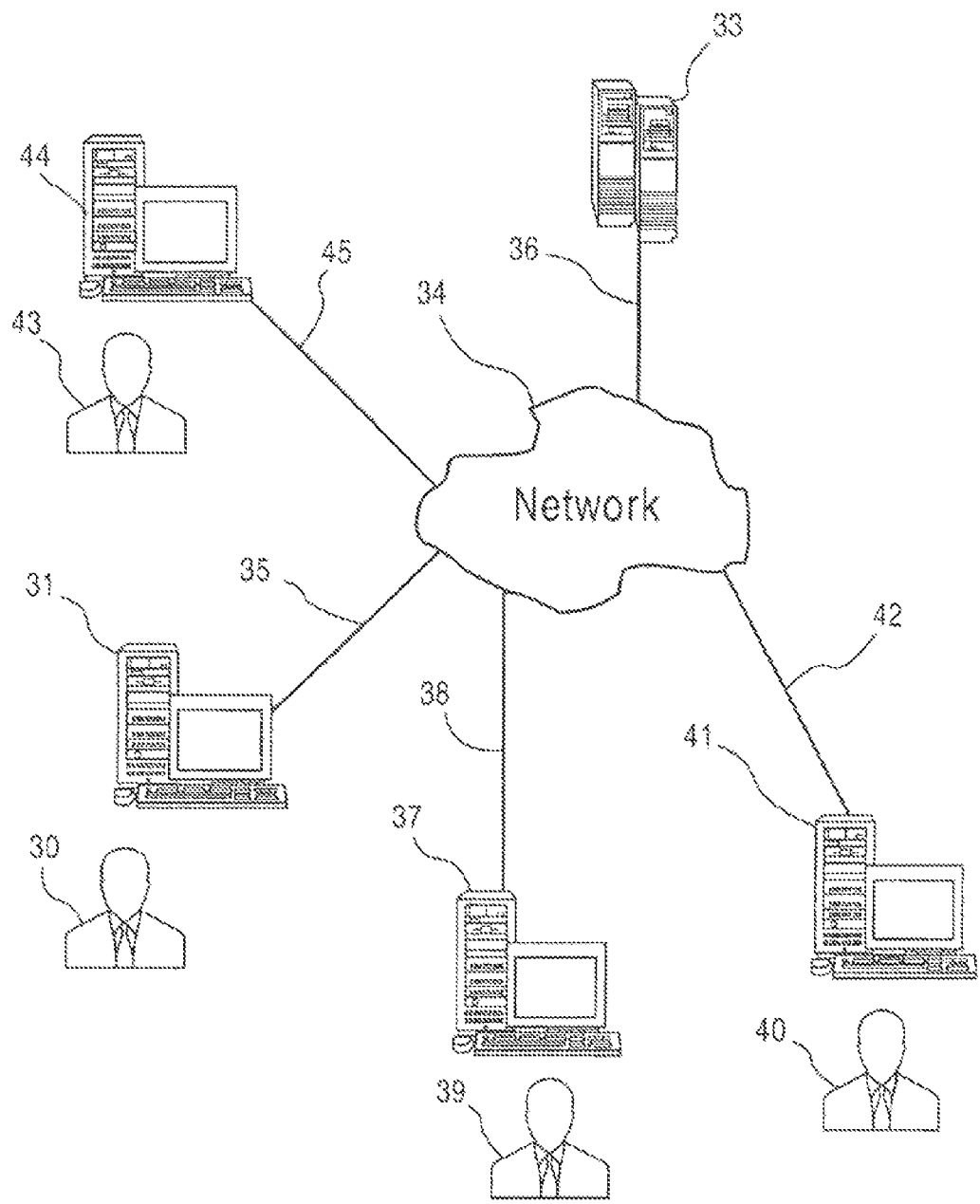
FIG. 2 presents an exemplary system diagram of various hardware components and other features in accordance with an embodiment of the present invention.

FIG. 2 presents an exemplary system diagram of various hardware components and other features in accordance with an embodiment of the present invention. As shown in FIG. 2, in an embodiment of the present invention, data and other information and services for use in the system is, for example, received from an end user 30 via a terminal 31. The terminal 31 is coupled to a server 33 via a network 34, such as the Internet, via couplings 35, 36. In one embodiment, a vendor 39 also inputs information/data via a terminal 37, via coupling 38, to the network 34. Furthermore, in one embodiment, a member of an outsourced workforce 40 inputs information/data via a terminal 41, via coupling 42, to the network 34, and in another embodiment, a member of a financial institution workforce 43 inputs information/data via a terminal 44 to the network 34 via coupling 45.

Each of the terminals 31, 37, 41, 44 comprises, for example, a personal computer (PC), minicomputer, mainframe computer, microcomputer, telephone device, personal digital assistant (PDA), or other device having a processor and input capability. Server 33 comprises a PC, minicomputer, mainframe computer, microcomputer, or other device having a processor and a repository for data or connection to a repository for maintained data.

In operation, according to an embodiment of the present invention, via the network 34, vendor data, transactional data, sub-transactional data, order data, and/or other information are communicated with the server 33. The server 33 receives and resolves transactions, including triggering and resolving sub-transactions, storing data regarding the transaction, vendor, and sub-transaction, and documenting the transaction (e.g., electronically).

In one embodiment, the present invention uses active server page (ASP) technology to deliver information and services to a user. This embodiment may include one or more ASPs stored on the server 33. Such approach reduces the maintenance expense and hardware expense, and results in limited implementation integration costs, limited support expense, and low total cost of ownership.

In one embodiment of the present invention, information relating to a transaction, such as a loan, is stored electronically. This information is referred to interchangeably herein as a virtual loan file. Among other features, the virtual loan file enables data mining, reduces post closing quality reviews, facilitates secondary market due diligence, streamlines loan servicing functions, reduces data archiving costs, reduces processing costs, automates routine and decision based processes, and reduces data entry errors.

Figure 3:
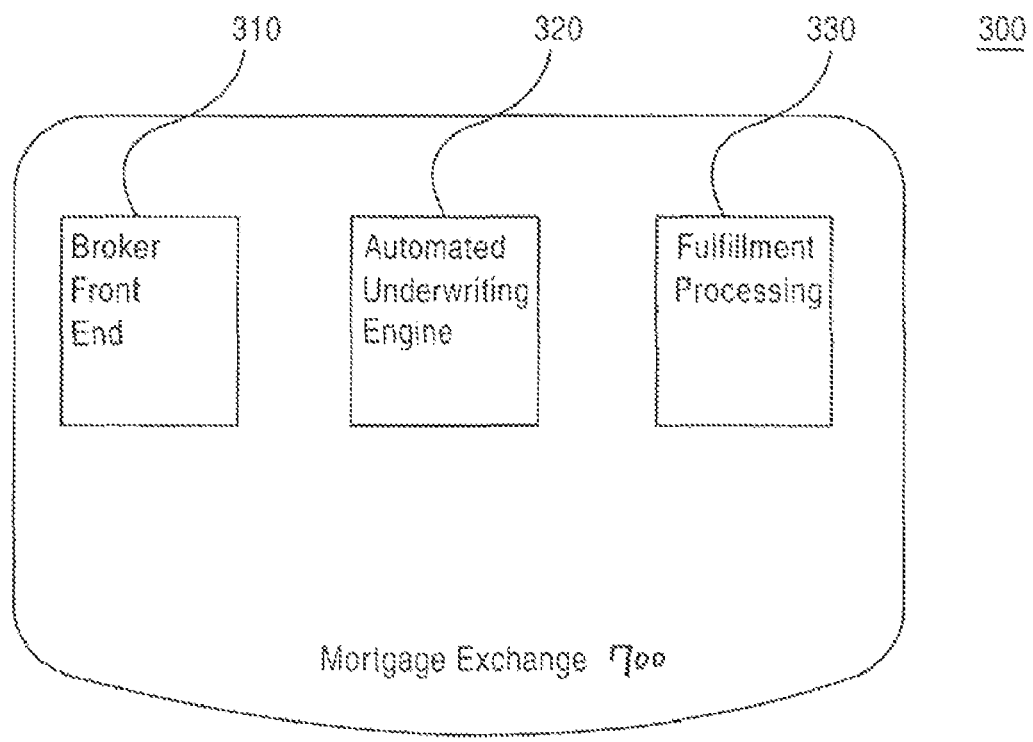
FIG. 3 shows a diagram of various features and processes carried out by one embodiment of the present invention.

FIG. 3 illustrates an exemplary mortgage exchange system 300 in accordance with one embodiment of the present invention. As shown in FIG. 3, the present invention is based on an open system architecture that provides a common base platform 700 for using the following customizable loan processing modules: 1) Broker Front End 310; 2) Automated Underwriting Engine 320; and 3) Fulfillment Processing 330, each of which will be discussed in more detail below.

The Broker Front End Module 310 facilitates communication between brokers and financial institutions, allowing a real-time access to loan information. This communication allows brokers to provide faster, more efficient service to potential borrowers, and to market loans directly to financial institutions, bypassing congregators and thereby eliminating congregator commission fees. Using the broker front end 310, brokers can select the most appropriate loan available for the potential borrower.

For a potential borrower on a corporate payroll, for example, some lenders may only require 25% of the loan amount as down payment. If the potential borrower is self-employed, that number may be as high as 35% for some lenders or even 50% for others. If the potential borrower is only able to make a down payment of 35%, for example, the system 300 automatically removes from consideration banks that require a larger down payment.

The Automated Underwriting Module 320 (interchangeably referred to herein as an "Automated Underwriting Engine") compiles the loan product information, combines it with the potential borrower information, searches loan products from multiple financial institutions and extrapolates the information into a decision matrix, which provides an accurate description of a potential borrower's qualification for specific loans. This decision matrix is based on real information from financial institutions, not from computer modeling estimates. Because the decision matrix is based on real information, if the decision matrix indicates that a potential borrower qualifies for a loan, then the broker can select that loan with confidence, and therefore begin working on financing the loan almost immediately. The loan search results can be displayed and sorted by any number of factors, including yield-spread premium, rate, principal and interest, and turn-around time.

When creating the decision matrix, the automated underwriting engine 320 also analyzes various conditions that the potential borrower may meet in order to alter the potential borrower's decision matrix, and informs the broker and/or the potential borrower that changing one of the potential borrower's loan decision metrics may qualify the borrower for a more advantageous loan. For example, if the potential borrower paid off a credit card, or saved an additional five thousand dollars, the associated decision matrix would change. The automated underwriting engine 320 displays this information to brokers, allowing the brokers to not only select the most advantageous loan, but also to present the best alternatives to potential borrowers. Sometimes a relatively unimportant action by the potential borrower may lead to a more favorable decision matrix. The automated underwriting engine 320 is capable of detecting this situation and reporting it to the broker.

The automated underwriting engine 320 automatically sorts through the available loan products published by the financial institutions and calculates whether a particular potential buyer qualifies for a particular loan. Each step in the process determines the loan types for which a potential borrower qualifies. Multiple steps thus create an exponentially increasing list of possibilities. In one embodiment of the present invention, the automated underwriting engine 320 ties in all available information on the potential borrower, such as debt-to-income ratios, the loan-to-value ratios, and the credit profile, and creates a profile for that borrower. In one embodiment of the present invention, this profile can be saved onto the system, so that if a potential borrower must repeat the process, the system can recall much of the required information, and update what information is needed, automatically.

Upon generation of the actual loan(s) for which a borrower qualifies, and selection of a specific loan, the Fulfillment Processing Module 330 notifies the respective financial institution that its loan offer has been accepted, generates the approval letter, and triggers any sub-transactions that are in place for the loan selection event. The Fulfillment Processing Module 330 also triggers any sub-transactions that the financial institution has specified in its profile as necessary for the completion of the particular loan. During this process, the information collected and generated by the automated underwriting module 320 is made available to involved parties, including brokers, potential borrowers, vendors, and financial institutions.

Figure 4:
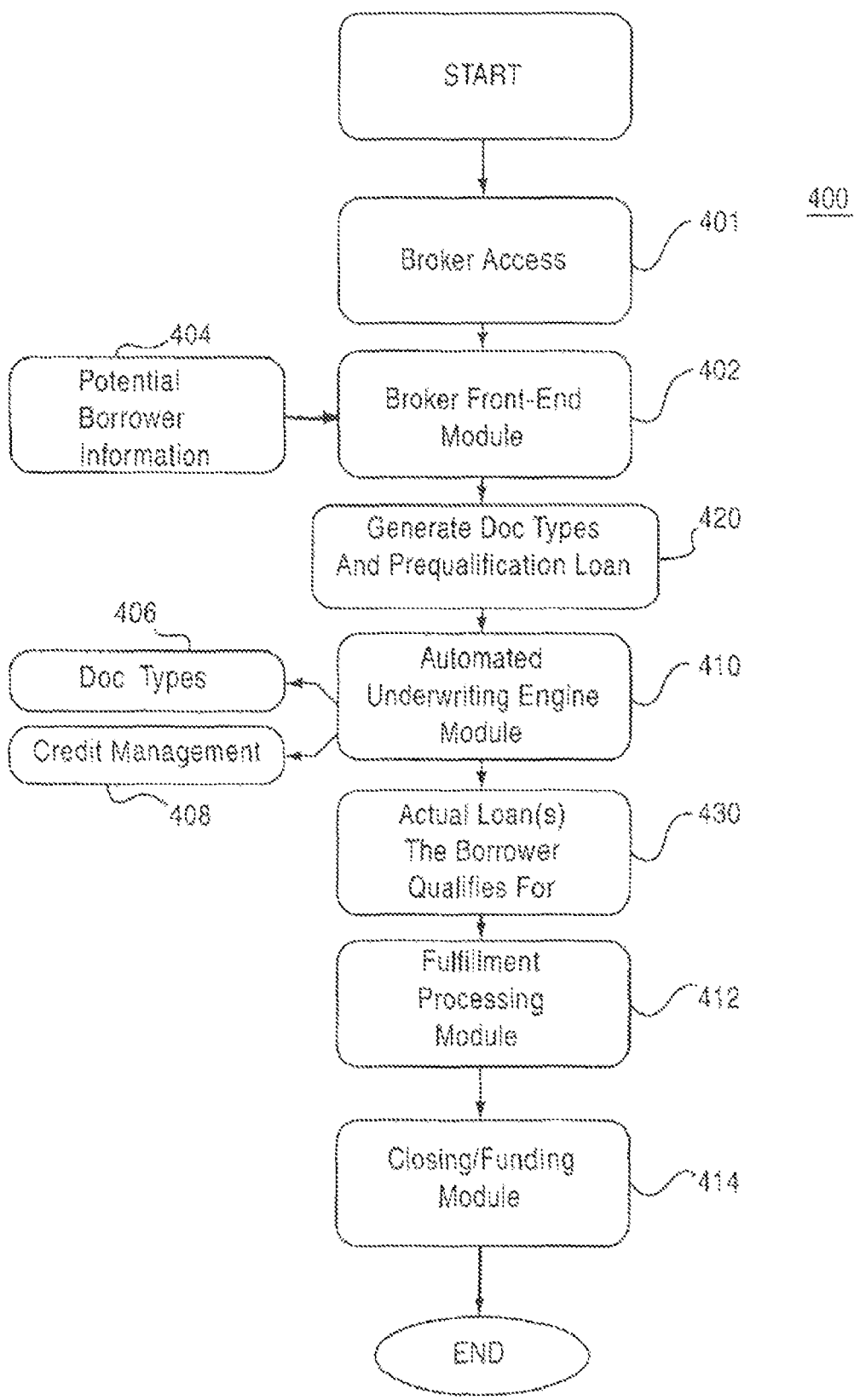
FIG. 4 presents an example flow diagram of functions performed from a broker point of view, in accordance with an embodiment of the present invention.

FIG. 4 shows a high-level view of an exemplary interaction 400 among the various modules used in conjunction with an embodiment of the present invention. After a broker accesses the mortgage exchange system at step 401, potential borrower information is retrieved at step 404 and the interaction 400 enters into broker front-end module at step 402. The broker front-end module then generates the document types required and a prequalification estimated loan at step 420 so that the potential borrower may receive a general assessment of the type of loan for which the borrower may be able to qualify. Next, the automated underwriting engine collects and extrapolates the information at step 410, creates the required document types at step 406, recommends credit managements for the potential borrower at step 408, and generates the actual loan(s) for which the borrower qualifies at step 430. Upon generation of the actual loan(s), the interaction 400 enters a fulfillment processing module at step 412, which manages any required sub-transactions, processes the terms of the loan with the financial institution or other lender, finalizes the loan, and generates an approval letter. The system proceeds to closing and funding of the approved loan at step 414.

Figure 5:
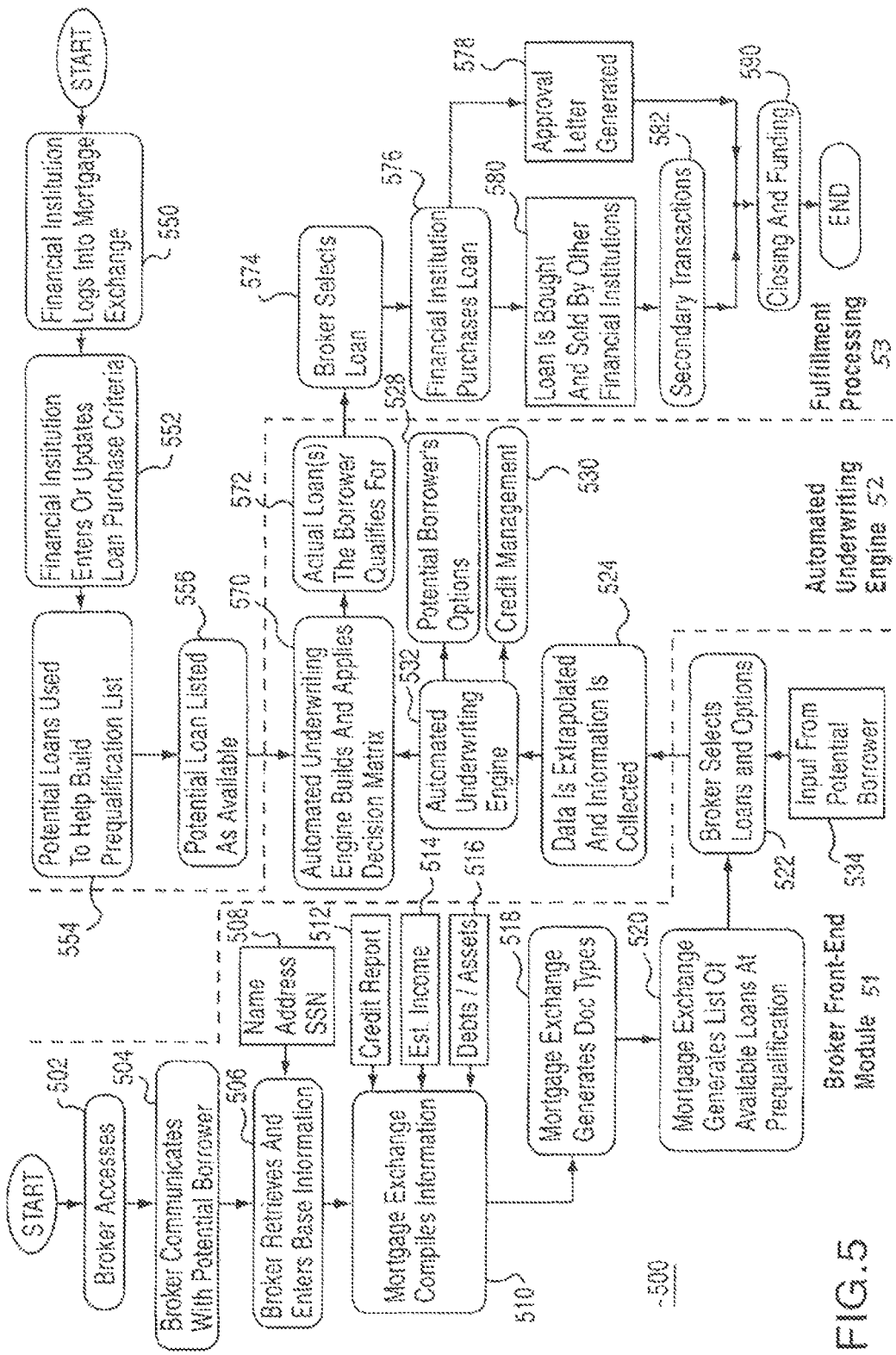
FIG. 5 presents an example flow diagram of the process carried out by one embodiment of the present invention when a financial institution accesses the system.

The more details of the mortgage exchange system and process 500 for a mortgage exchange are described with reference to FIG. 5. As described above, the exemplary mortgage exchange system is divided into three parts: a Broker Front-End Module 51, an Automated Underwriting Engine 52, and Fulfillment Processing Module 53. The process 500 starts with a broker accessing the system at step 504. At steps 506 and 508, the broker communicates with the potential borrower (e.g., by telephone, e-mail, or in person), and retrieves and enters the potential buyer's base information, such as name, address, and social security number. The process 500 then compiles the base information, at step 510, needed to complete prequalification for the potential borrower, such as a credit report 512, estimated income 514, and debt and asset information 516. At step 518, the information is compiled into a document type.

The process 500 then generates a list of available loans based on the prequalification at step 520. The broker then selects the type of loan (e.g., 10-year fixed, 30-year fixed, interest-only) and the options available for that loan at step 522, based on input from the potential borrower at step 534. Please note that the above steps are performed on the broker front-end module 51.

Next, the automatic underwriting engine 52 collects and processes such information to create a decision matrix at steps 524-570. The key factors include, among others, determining whether a loan will default, weighing the strengths and weaknesses of the loan application, interpolating probable loan success information, based on performance of similar loans, the goals and strategies of financial institutions, current market factors, the possibility of selling the loan on the open market, and the strategy of the financial institution that may purchase the loan.

In addition, the automated underwriting engine 52 performs credit management at step 530, such as to determine whether the borrower may, by changing certain facts and/or behaviors, qualify for a more advantageous loan. As an example, at step 528, the automated underwriting engine 52 takes into consideration whether completing tasks may improve the borrower's credit, and allows time for the potential borrower to complete the tasks or choose a different route.

Once the credit management steps are complete, the automated underwriting engine 52 builds a decision matrix at step 570, which includes the potential borrower's actual qualifications, and provides a list of the loans for which the borrower actually qualifies at step 572, which allows the broker to make a loan selection at step 574.

Afterward, the process 500 continues at the fulfillment processing module 53. At step 576, the loan selected by the broker is purchased by a financial institution that is interested in the loan, and at step 578, an approval letter is generated. The process 500 then seamlessly integrates with systems that handle closing and funding of the loan at step 590.

An alternative approach is that the mortgage exchange system provides for the reselling of the loan from one financial institution to another, as shown at step 580, so that secondary transactions are performed at 582. The secondary transactions are transactions involving the exchange and finance of the loan between financial institutions. These transactions typically do not directly affect the borrower.

From the financial institution's point of view, the process begins when the financial institution accesses the mortgage exchange system, which is shown at steps 550-556. After accessing the mortgage exchange system at step 550, the financial institution enters/updates its loan purchase criteria at step 552. The financial institution has the ability to customize these criteria, depending on the broker that is offering the loan for sale. In this way, the financial institution can indicate a preference of one broker over another, based on past performance or other factors. Once the loan criteria are entered, the potential loans for that financial institution are recorded in the mortgage exchange system for use in the prequalification stage at step 554. As such, at steps 556 and 557, the potential loan is listed as available, and is used as part of the input in the automated underwriting engine 52 when the loans for which the potential borrower qualifies at step 572.

Figure 6:
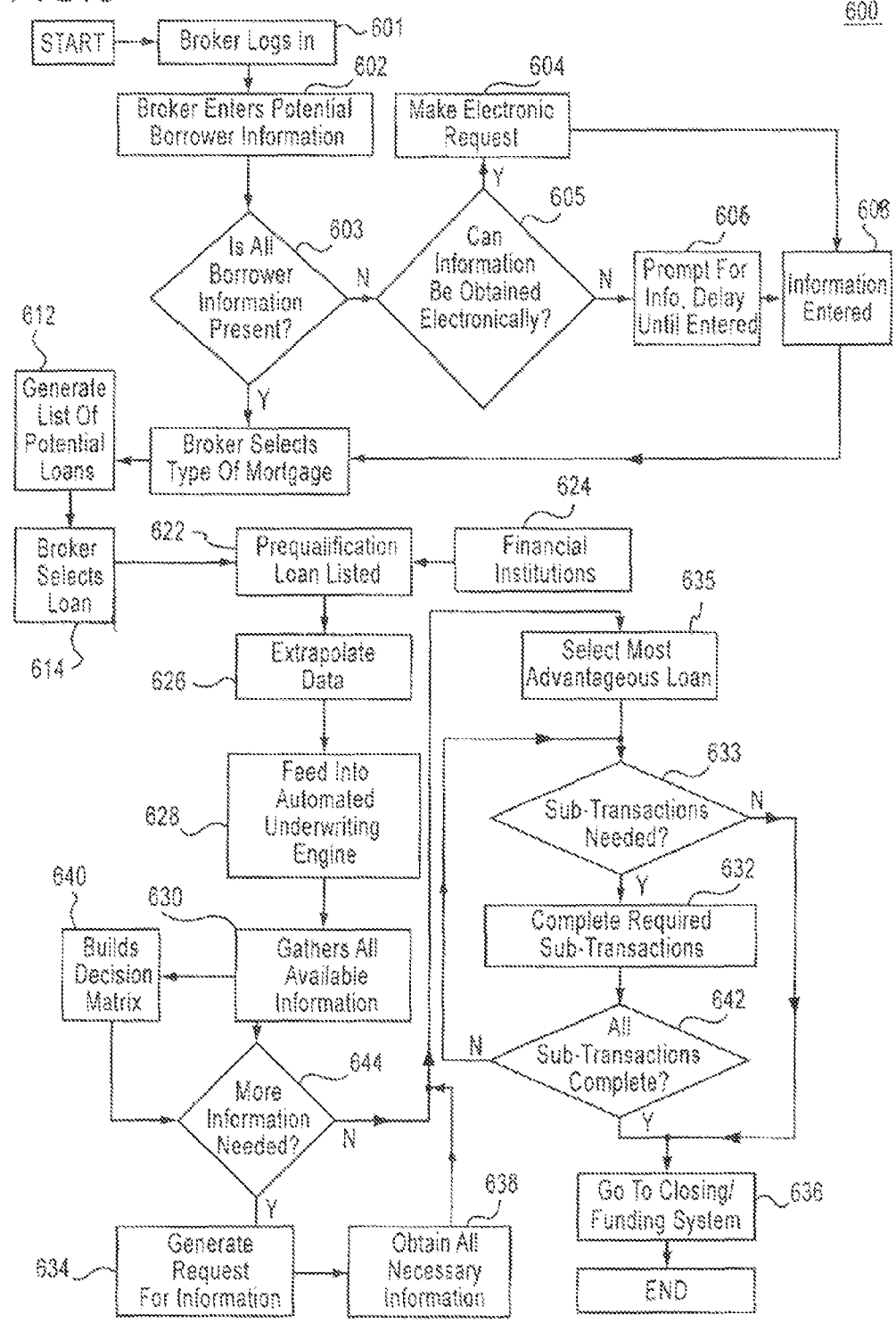
FIG. 6 presents a high-level block diagram of the different modules of one embodiment of the present invention, and the interaction among these modules.

FIG. 6 is a flowchart showing various actions, from a broker's point of view, preformed in accordance with one exemplary embodiment of the present invention. Process 600 starts when a broker accesses a mortgage exchange system (not shown) at step 601. The broker enters the potential borrower's base information at step 602. At steps 603 and 605, if the broker does not have all necessary information pertaining to the borrower, the process 600 determines whether the missing information may be obtained electronically. If so, the system generates a request for the information at step 604 (e.g., a source of credit information). If the missing information cannot be obtained electronically, the system prompts for the information to be entered at step 606, and receives the information when inputted at step 608. Once the necessary information has been entered into the system, at step 610, the broker selects the type of mortgage 610 in which the potential borrower is interested, and enters any additional information required. Upon entry of all required information and selection of the type of mortgage requested, the process 600 generates a list of different types of available prequalification loans at step 612. The broker then, at step 614, selects one of the loans from the list, depending on the potential borrower's preferences and purchasing ability.

After a loan is selected, the mortgage exchange system lists the selected prequalification loan at step 622, based on the financial institution's requirements for loan criteria of step 624. The system then extrapolates the available data from the loan and the potential buyer's information at step 626, and inputs the information into an automated underwriting engine at step 628. The automated underwriting engine gathers all the available information at step 630 and builds a decision matrix at step 640. Preferably, the decision matrix lists, among other values, possible loans and loan packages, and the potential value in each loan. According to the present invention, the matrix is configured to allow selection of the best possible loan, based not on estimation, but on actual data.

If more information on the potential borrower is required, the process 600 proceeds step 634, where it generates a request for information from the potential borrower. Once the necessary information has been obtained, the broker, with assistance from the potential borrower, selects the most advantageous loan at step 635, for example. The process 600 then checks whether any sub-transactions at step 633 associated with the selected loan are necessary. If so, at step 632, the process 600 either completes the necessary sub-transaction automatically, or creates a prompt that requires operator assistance for a required sub-transaction. At step 642, when all sub-transactions are completed, i.e., the selected loan is completed, the mortgage exchange system then seamlessly provides the required information to closing and lending units at step 636. On the other hand, at step 633, if there is no sub-transaction needed, which means the selected loan is completed without any sub-transactions, the process 600 proceeds to step 636, where the mortgage exchange system seamlessly provides the required information to the closing and lending units.

Figure 7:
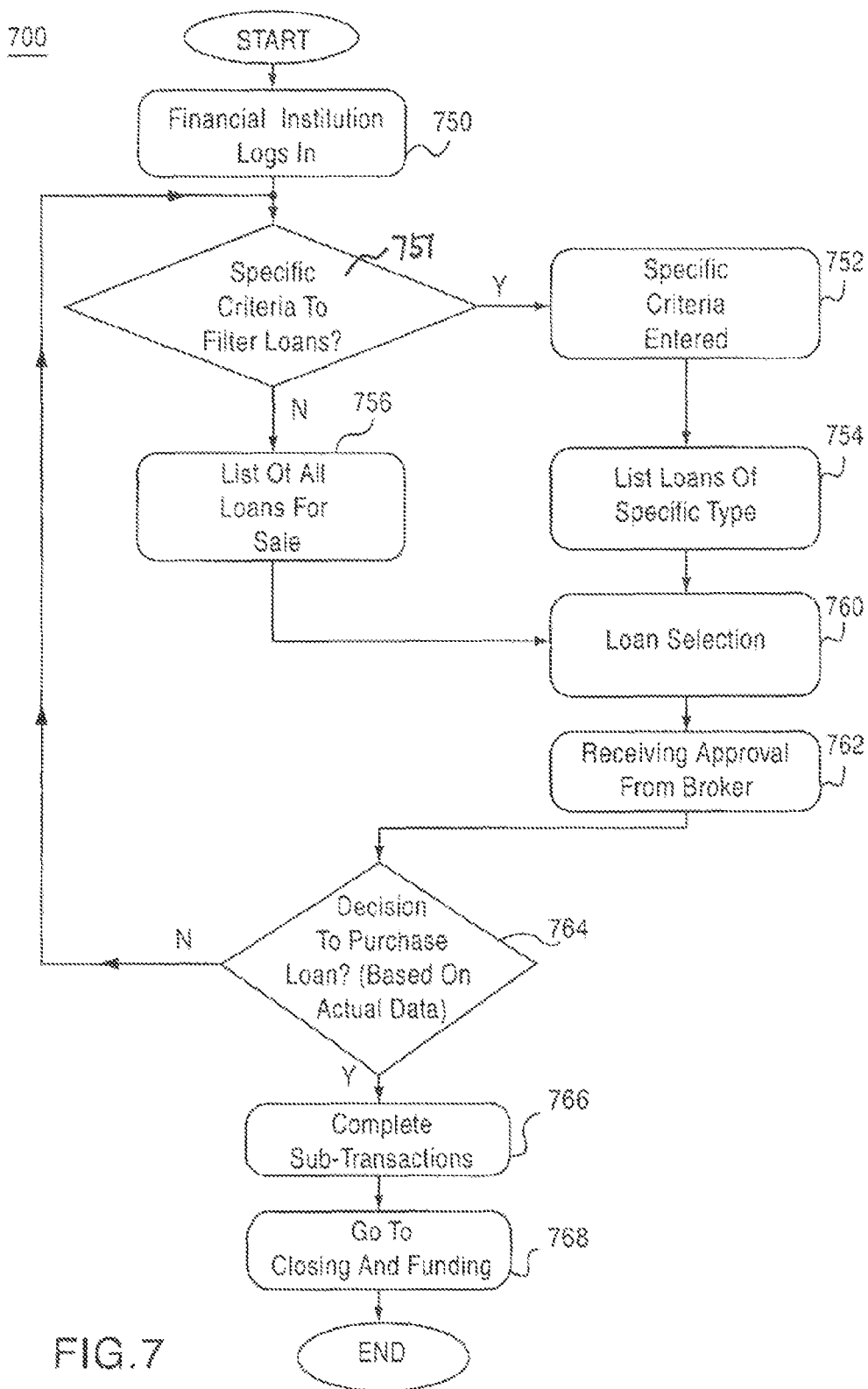
FIG. 7 shows an example open system platform used in conjunction with an embodiment of the present invention that utilizes Broker Front End, Automated Underwriting Engine, and Fulfillment Processing customizable loan processing modules.

FIG. 7 is a flow chart of various actions, from the point of view of a financial institution, that are performed in an embodiment of the present invention. Process 700 starts when the financial institution logs in a mortgage exchange system of the present invention as shown at step 750. At step 751, it is determined whether an option of filtering available loans using specific criteria is available. If the financial institution is not interested in filtering the loans, all loans for sale are displayed at step 756. If the financial institution decides to filter the loans, the financial institution enters the specific criteria at step 752 so that a list of brokers selling loans of that specific type is generated by the mortgage exchange system, as shown at step 754. The financial institution can sort and display the lists of loans according to different metrics, such as buydowns, lock type, document type, finance type, occupancy or region.

Next, at step 760, the financial institution selects and makes an offer on a loan. At this time, approval of the financing from a broker may be needed (e.g., if more than one financial institution has made an offer on the loan,) as shown at step 762. The financial institution then, at step 764, has the ability to select whether to finance the loan, based on actual information about the potential borrower's ability to pay the loan back, not on estimates about the potential borrower. Using the information contained in a decision matrix that is generated by the mortgage exchange system when receiving necessary information of the potential borrower, the financial institution has the ability to view data interpolated from loans with similar profiles. This information provides more accurate analysis of the risk that the financial institution will incur by financing the loan. If the financial institution makes the decision to purchase the loan at step 764, the process 700 checks whether sub-transactions are required for completing the loan transaction at step 766. If the answer is yes, the process 700 either completes the sub-transactions automatically, or creates a prompt that requires operator assistance for a required sub-transaction. When all sub-transactions are completed, the loan is fully processed, and the system seamlessly provides the required information to closing and lending units, as shown at 768. If the answer is no at step 764, however, the financial institution will go back to step 751 to select other available loan.

While the present invention has been described in connection with preferred embodiments, it will be understood by those skilled in the art that variations and modifications of the preferred embodiments described above may be made without departing from the scope of the invention. Other embodiments will be apparent to those skilled in the art from a consideration of the specification or from a practice of the invention disclosed herein. It is intended that the specification and the described examples are considered exemplary only, with the true scope of the invention indicated by the following claims.

The invention claimed is:

1. A method for electronically facilitating a mortgage loan transaction via a computer comprising at least one processor and memory operatively coupled to the at least one processor, the method comprising:
   a. receiving data associated with a plurality of loan products;
   b. receiving data associated with a borrower;
   c. generating, via the at least one processor, a decision matrix for the borrower comprising an extrapolation of a combination of the borrower data and the plurality of loan product data to provide an accurate description of the borrower's qualification for specific loan products from the received plurality of loan products;
   d. generating, via the at least one processor, a list of loans the borrower is approved for based on the extrapolated information from the decision matrix;
   e. selecting, via the processor, an approved loan product from the generated list of loans;
   f. automatically, via the at least one processor, ordering sub-transactions associated with the selected approved loan product that are necessary to facilitate the closing of the selected approved loan product.

2. The method of claim 1, wherein the generated decision matrix extrapolated information contains at least one of:
   a. determining a likelihood of loan default;
   b. weighing the strengths and weaknesses of the loan application; and
   c. interpolating probable loan success information based on at least one of performance of similar loans, the goals and strategies of financial institutions funding the loan, current market factors and a strategy of a financial institution that may purchase the loan in a secondary market.

3. The method of claim 1, wherein the step of automatically ordering sub-transactions further comprises:
   a. identifying each sub-transaction associated with the selected loan product;
   b. automatically, via the at least one processor, ordering each identified sub-transaction;
   c. receiving a result for each ordered sub-transaction; and
   d. updating, via the at least one processor, a loan transaction virtual file with the received result.

4. The method of claim 1, further comprising, prior to the step of selecting an approved loan product, the steps of:
   a. automatically performing credit management, via the at least one processor, to determine whether the borrower by changing certain borrower data would cause the decision matrix to change resulting in the borrower's approval of more advantageous loan products from the received plurality of loan products;
   b. generating, via the at least one processor, an updated decision matrix based on the changed borrow data; and
   c. determining, via the at least one processor, based on the updated decision matrix a list of new loan products.

5. The method of claim 4, further comprising the steps of:
   a. presenting, via the at least one processor, the list of proposed changes in borrower data and the associated new loan products that would be approved if the borrower selects one or more changes to the borrower data; and
   b. receiving, via the at least one processor, the borrower's selected one of the new loan products based on the borrower data that the borrower has agreed to modify.

6. A method for electronically facilitating a loan transaction via a computer comprising at least one processor and memory operatively coupled to the at least one processor, the method comprising:
   a. receiving data associated with a plurality of loan products;
   b. receiving data associated with a borrower;
   c. generating, via the at least one processor, a decision matrix for the borrower comprising a combination of the borrower data and the plurality of loan product data to provide an accurate description of the borrower's qualification for specific loan products from the received plurality of loan products;
   d. automatically performing credit management, via the at least one processor, to determine whether changing certain borrower data would cause the decision matrix to change resulting in the borrower's approval of at least one more advantageous loan product from the received plurality of loan products;
   e. generating, via the at least one processor, a list of loan products the borrower is approved for based on information from the decision matrix;
   f. presenting, via the at least one processor, based on the credit management step, the at least one borrower data element that must change to receive the at least one more advantageous loan product from the received plurality of loan products.

7. The method of claim 6, wherein the change in the borrower data is at least one of paying off a credit card balance, saving an additional sum of money, closing a line of credit and increasing the down payment for the loan transaction.

8. The method of claim 6, further comprising the step of selecting, via the at least one processor, one loan product from the list of approved loan products.

9. The method of claim 8, further comprising the step of automatically ordering sub-transactions, via the at least one processor, associated with the selected loan product that are required to allow the selected loan product to be funded.

10. The method of claim 9, further comprising the step of closing the transaction associated with the selected loan product.

11. The method of claim 6, wherein the generated decision matrix contains information based on at least one of
   a. determining a likelihood of loan default;
   b. weighing the strengths and weaknesses of the loan application; and
   c. interpolating probable loan success information based on at least one of performance of similar loans, the goals and strategies of financial institutions, current market factors and a strategy of a financial institution that may purchase the loan in a secondary market.

12. The method of claim 6, wherein the credit management step generates an updated decision matrix that contains a combination of the plurality of loan product data and the projected changed borrower data.

13. The method of claim 12, wherein the step of presenting, via the at least one processor, based on the credit management step, at least one borrower data element that must change further comprises presenting, via the at least one processor, at least one additional loan product associated with the at least one borrower data element that is projected to change.

14. The method of claim 13, wherein the step of presenting, via the at least one processor, based on the credit management step, at least one borrower data element that must change further comprises presenting, via the at least one processor, a plurality of combinations of borrower data elements that are projected to change and at least one additional loan product associated with each respective one of the plurality of combinations.

15. A system for electronically facilitating a loan transaction via a computer comprising:
 a. at least one processor,
 b. memory operatively coupled to the at least one processor,
 c. at least one user interface operatively coupled to the at least one processor; and
 d. a data repository stored in the memory and accessible by the at least one processor,
  wherein the at least one processor is configured to:
   i. retrieve data associated with a plurality of loan products from the data repository;
   ii. receiving data, via the at least one user interface, associated with a borrower;
   iii. generate a decision matrix for the borrower comprising a combination of the received borrower data and the plurality of loan product data to provide an accurate description of the borrower's qualification for specific loan products from the retrieved plurality of loan products;
   iv. automatically perform credit management to determine whether changing at least one borrower data element causes the decision matrix to change resulting in the borrower's approval of at least one more advantageous loan product from the plurality of loan products;
   v. generate a first list of loan products the borrower is approved for based on information from the decision matrix and the at least one more advantageous loan product that the borrower would be approved for if the borrower accepted the at least one proposed change to the borrower data elements;
   vi. presenting, on the at least one user interface, one of the first list of approved loan products;
    the at least one borrower data element that can change to receive the at least one more advantageous loan product; and
    the at least one more advantageous loan product associated with the at least one borrower data element change.

16. The system of claim 15, wherein the decision matrix further comprises information based on at least one of
 a. determining a likelihood of loan default; and
 b. interpolating probable loan success information based on at least one of performance of similar loans, the goals and strategies of financial institutions, current market factors and a strategy of a financial institution that may purchase the loan in a secondary market.

17. The system of claim 15, wherein the processor is configured to receive a selection of a loan product from the borrower.

18. The system of claim 17, wherein the processor is configured to automatically order at least one sub-transaction associated with the selected loan product that is needed in advance of a funding and a closing of the selected loan product.

19. The system of claim 16, wherein said processor is configured to fund the loan by:
 a. presenting a list of loans available for purchase by a lending institution;
 b. filter the list of loans available for purchase based on a preset criteria important to a particular lending institution;
 c. present decision matrix information to the lending institution for review so that the at least one of the likelihood of loan default and interpolating probable loan success information can be used for accessing the value of the closed loan product in the secondary market; and
 d. receive purchase information from the lending institution so that the loan product can be funded and closed.

20. The system of claim 15, wherein:
a. the at least one processor further comprises a plurality of processors operatively coupled to each other over a communication network; and
b. the at least one user interface further comprises a plurality of user interfaces operatively coupled to at least one of the plurality of processors.

* * * * *